(12) United States Patent
Stelmar Netto

(10) Patent No.: US 9,535,751 B2
(45) Date of Patent: Jan. 3, 2017

(54) RESOURCE SELECTION ADVISOR MECHANISM

(75) Inventor: Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 13/233,114

(22) Filed: Sep. 15, 2011

(65) Prior Publication Data
US 2013/0073713 A1 Mar. 21, 2013

(51) Int. Cl.
G06F 15/173 (2006.01)
G06F 9/50 (2006.01)
H04L 12/24 (2006.01)
H04L 12/26 (2006.01)

(52) U.S. Cl.
CPC ......... G06F 9/5011 (2013.01); H04L 41/0883 (2013.01); *H04L 43/08* (2013.01)

(58) Field of Classification Search
CPC .. H04L 41/0823; H04L 41/0883; H04L 43/08; H04L 67/1004; H04L 67/1012
USPC ................................................ 709/223–225
See application file for complete search history.

(56) References Cited

U.S. PATENT DOCUMENTS 7,634,737 B2 12/2009 Beringer
8,296,251 B1 * 10/2012 Athayde ......................... 706/45
8,606,894 B1 * 12/2013 Fremont ............... G06F 9/5061
                                                         709/223
2002/0138561 A1 * 9/2002 Chatfield et al. ............. 709/203
2006/0143617 A1 * 6/2006 Knauerhase et al. ......... 718/104
2007/0061465 A1 * 3/2007 Kim et al. ..................... 709/226
2008/0172673 A1   7/2008 Naik
2008/0201705 A1 * 8/2008 Wookey ........................ 717/175
2011/0010349 A1 * 1/2011 Ellingson et al. ............ 707/695
2011/0016214 A1   1/2011 Jackson
2011/0107318 A1 * 5/2011 Kumar ......................... 717/168
2011/0131431 A1 * 6/2011 Akers et al. .................. 713/320
2011/0320373 A1 * 12/2011 Lee et al. ...................... 705/319
2012/0096149 A1 * 4/2012 Sunkara et al. .............. 709/224
2012/0123993 A1 * 5/2012 Wang et al. .................... 706/52
2013/0103556 A1 * 4/2013 Lyon .............................. 705/34
2013/0254385 A1 * 9/2013 Lyon ............................. 709/224

OTHER PUBLICATIONS

Amazon EC2, http://aws.amazon.com/ec2/ pp. 1-12, downloaded Dec. 8, 2011.

(Continued)

*Primary Examiner* — Jason Recek
(74) *Attorney, Agent, or Firm* — Ryan, Mason & Lewis, LLP

(57) ABSTRACT

A method, an apparatus and an article of manufacture for generating resource selection information. The method includes monitoring at least one resource and at least one resource change performed by at least one user, analyzing a user request, wherein the user request comprises resource parameter information, searching for at least one similar resource request based on the user request and on monitored information and generating an output based on analysis of the user request, wherein the output comprises at least one candidate resource set and a corresponding rationale for selection of the at least one candidate resource set based on historical data.

21 Claims, 4 Drawing Sheets

(56) References Cited

OTHER PUBLICATIONS

Filepp et al., Image Selection as a Service for Cloud Computing Environments. Proceedings of the IEEE International Conference on Service-Oriented Computing and Applications (SOCA'10) 2010.
Andrejs Abele, Ontology Based Configuration of Virtual Systems in a Computer Cloud, pp. 7-15 Learning in Networks, 2010.
Wang et al., Rethink the Virtual Machine Template, VEE'11, Mar. 9-11, 2011.
Amazon, http://www.amazon.com, pp. 1-3, downloaded Dec. 8, 2011.

\* cited by examiner

RESOURCE SELECTION ADVISOR MECHANISM

FIELD OF THE INVENTION

Embodiments of the invention generally relate to information technology, and, more particularly, to public cloud resource selection.

BACKGROUND OF THE INVENTION

In order to reduce information technology (IT) costs of acquiring and/or managing an infrastructure, home users and organizations are moving their workloads to public Cloud providers, which host virtual machines (VMs) with different properties (for example, central processing unit (CPU), memory, disk size, software stack, software versions, and services). One difficulty raised in this scenario is that users have to select VMs (also referred to as VM templates), among several options offered by providers. The selection can be challenging as users do not necessarily know how their workload will perform (that is, speed, robustness, scalability, etc.) in an unknown environment and existing templates may not meet their exact needs.

Existing approaches for selecting resources (in the case of Clouds and VM templates) are based on the following. For example, Cloud providers can simply show users the available VM templates and let users select these templates according to their needs. Also, Cloud providers can show users (or select) the closest templates that match user needs against available templates, which can be described using free text format and ontologies. Additionally, providers can create customized templates according to user needs, an approach more commonly present in private clouds.

However, a problem among the existing solutions is that users may have little experience on the target environment, and hence, selecting proper templates is a difficult task. On the other hand, Cloud providers can sometimes include a knowledge base of application executions and resource selections of other users. However, in a Cloud scenario, resource selection is dynamic, and the level of user experience details is often extremely high, and, moreover, user experience changes over time.

SUMMARY OF THE INVENTION

In one aspect of the present invention, a resource selection advisor mechanism is provided. An exemplary computer-implemented method for generating resource selection information can include steps of monitoring at least one resource and at least one resource change performed by at least one user, analyzing a user request, wherein the user request comprises resource parameter information, searching for at least one similar resource request based on the user request and on monitored information and generating an output based on analysis of the user request, wherein the output comprises at least one candidate resource set and a corresponding rationale for selection of the at least one candidate resource set based on historical data.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

As described herein, an aspect of the present invention includes advising users in the resource selection of public cloud providers. Cloud providers, as understood by one of skill in the art, are service and resource providers that follow the cloud computing model. In this model, providers offer on-demand services and resources via a communication network. As detailed herein, cloud providers can leverage information of users' experience and applications to advise new users (or new requests of existing users) on selecting appropriate resources. This information can include a database of users' experience over time on selecting resources based on their needs. Both providers and users can add information to these databases. Providers can monitor user applications and resource usage (for example, CPU, memory, disk, and software stack), and users can extend these databases by informing providers on reasons why particular resource set changes were necessary.

In an aspect of the invention, when a user request resources, the user receives from the provider an advice report on resource sets that could be selected, and the respective reasons for choosing them, which include lessons learnt from other users. Advice reports can also be useful, by way of example, for system administrators working with workload migration in private/hybrid clouds. For generating the report, the providers look for similarities not only between the new request and the current used resource sets, but also between the new request and the original resource sets of current users. Accordingly, an aspect of the invention includes leveraging user experience over time to help users (for example, new users or pre-existing users with new queries) to select resources in public Clouds.

In contrast to existing approaches, embodiments of the invention include keeping track of reasons why a user decides to change resource sets and the impact of these changes on the user's applications. This information can be useful for users (and system administrators of private Cloud providers) to make better resource selection decisions.

Figure 1:
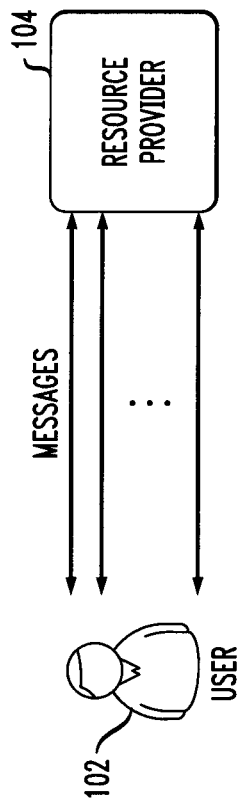
FIG. 1 is a diagram illustrating computing environment components, according to an embodiment of the present invention.

FIG. 1 is a diagram illustrating computing environment components, according to an embodiment of the present invention. By way of illustration, FIG. 1 depicts a target computing environment which includes users 102, resource providers 104 managing computing capacity (for example, a plurality of computers, network bandwidth, or services), and interaction messages between users and resource providers. The messages are used by providers and users to negotiate a resource set.

Figure 2:
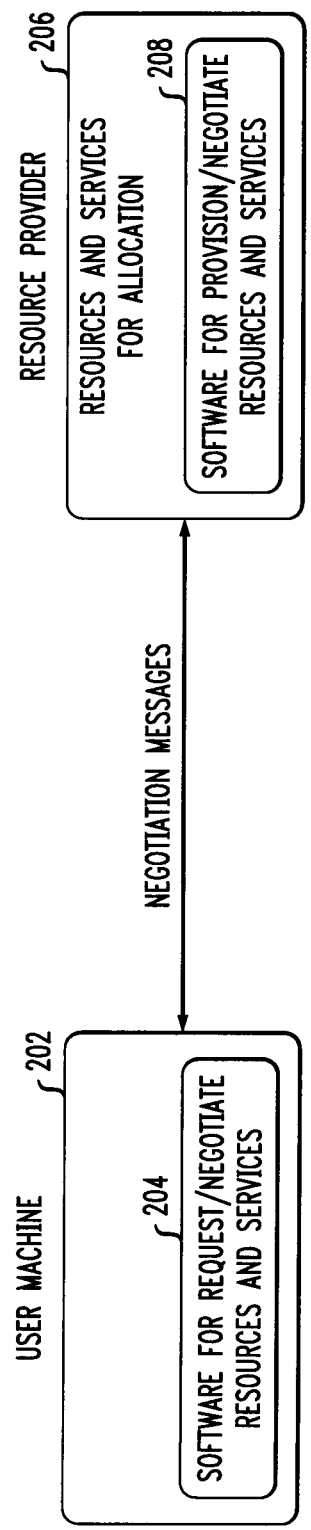
FIG. 2 is a diagram illustrating message transfer components, according to an embodiment of the present invention.

FIG. 2 is a diagram illustrating message transfer components, according to an embodiment of the present invention. By way of illustration, FIG. 2 depicts a user machine 202 with a messaging software module 204, as well as a resource provider 206 with a messaging software module 208. The software modules 204 and 208 enable the transfer of messages between the user machine 202 and resource provider 206. Additionally, the software modules 204 and 208 are implemented for the negotiation/allocation/provisioning of resources and services. A user can contact one or multiple providers and a provider can be contacted by multiple users. However negotiation occurs in pairs: user and provider.

The difficulty for users in selecting resources to run their applications is made even more difficult when users do not know details on the computing environment, which is the case of a public cloud computing scenario. To address this difficulty, providers can leverage knowledge of behavior and resource needs over time from several users in the cloud infrastructure to assist the new user/request, as depicted in FIG. 3.

Figure 3:
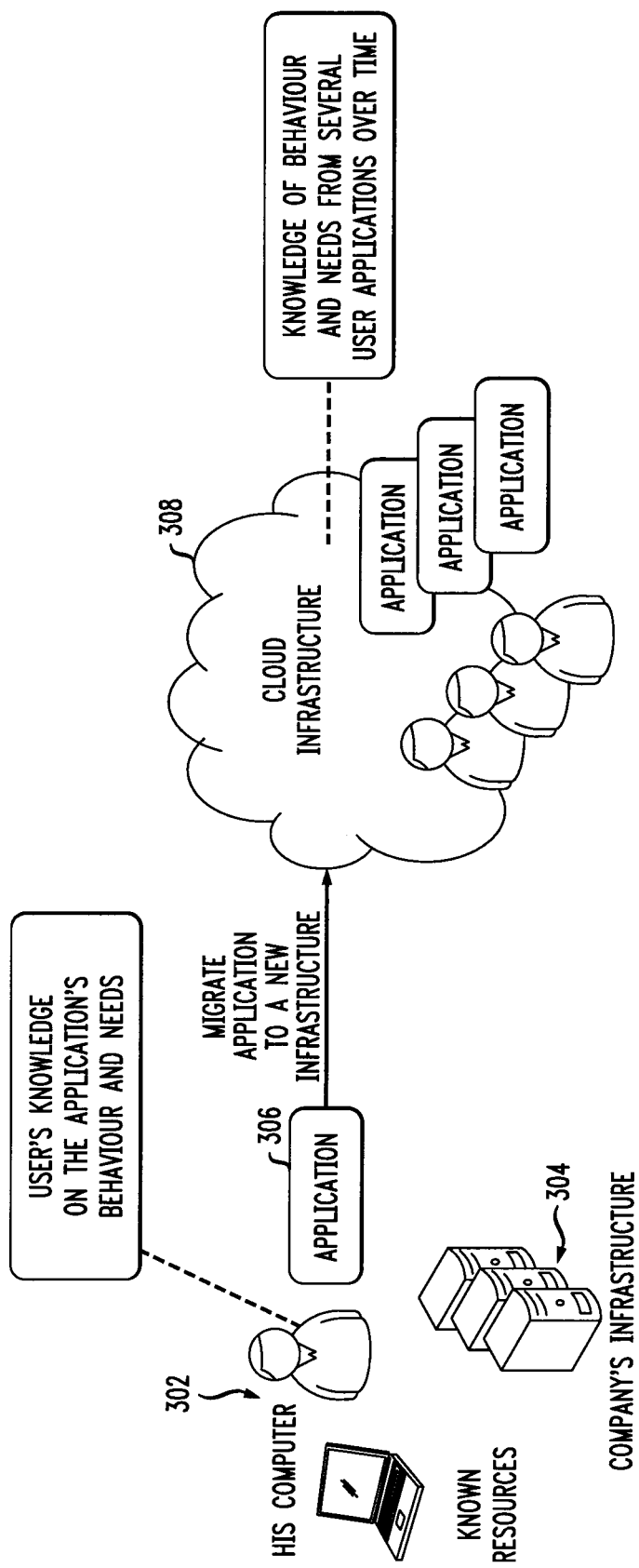
FIG. 3 is a diagram illustrating cloud infrastructure components, according to an embodiment of the present invention.

FIG. 3 is a diagram illustrating cloud infrastructure components, according to an embodiment of the present invention. By way of illustration, FIG. 3 depicts a user 302 (as well as a user computer), a user's company infrastructure 304, a user application 306 that the user 302 is migrating to a cloud infrastructure 308. The user 302 can possess knowledge of the application's 306 behavior and needs, while the cloud infrastructure 308 includes knowledge of behavior and needs from multiple user applications over time. Additionally, as detailed herein, a new user may have limited information of the cloud infrastructure to decide on which resource sets he/she should allocate. Even with full information about it, the new user/request could benefit of other users experience using the computing environment.

Figure 4:
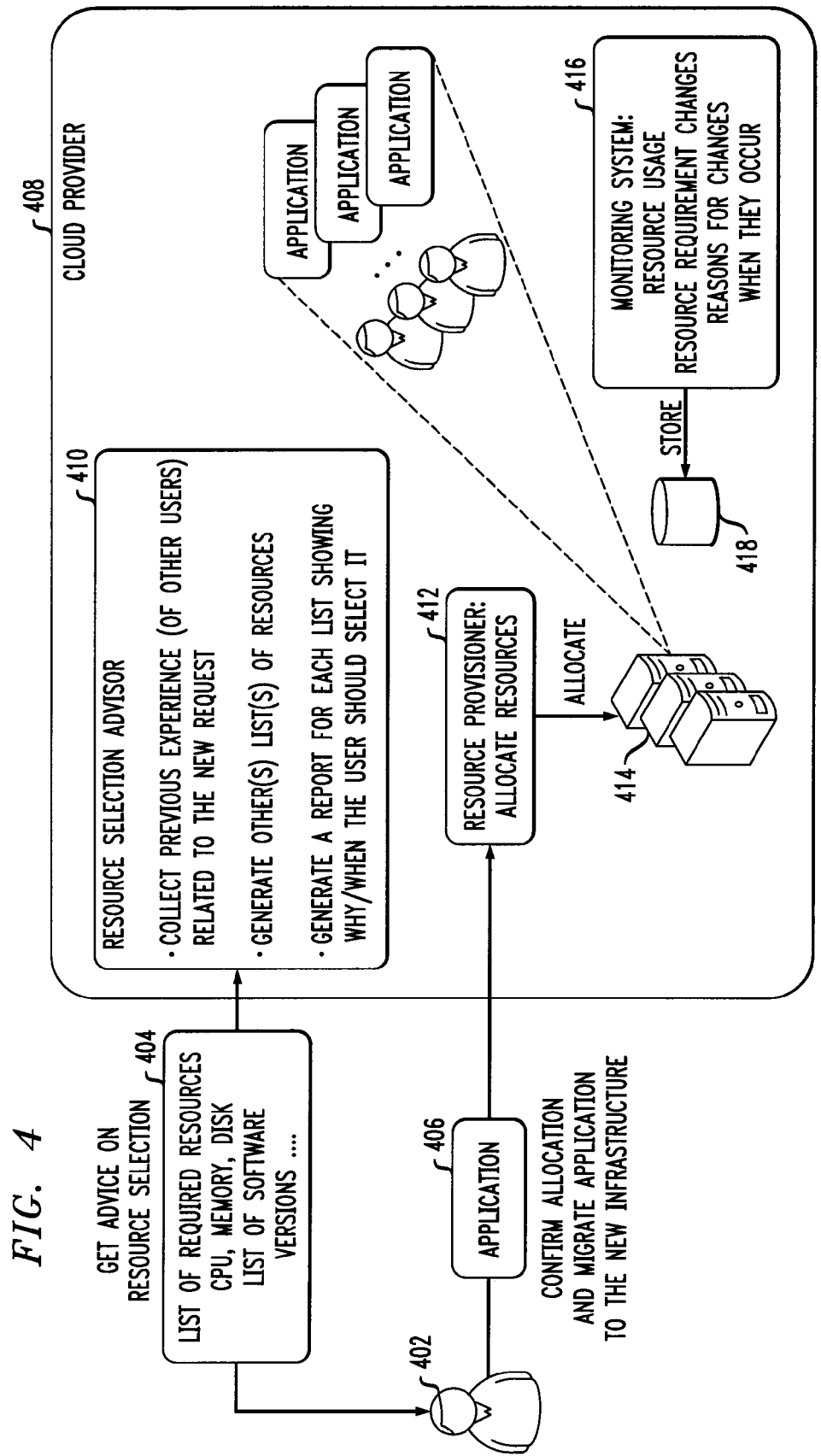
FIG. 4 is a diagram illustrating system components, according to an embodiment of the present invention.

FIG. 4 is a diagram illustrating system components, according to an embodiment of the present invention. By way of illustration, FIG. 4 depicts a user 402, a list of required resources 404 and an application 406. FIG. 4 also depicts a cloud providing 408, which includes a resource selection advisor module 410, a resource provisioner module 412, cloud infrastructure 414 (which includes multiple applications), a monitoring system module 416 and a database 418. As described herein, a resource selection advisor module collects previous experience (for example, of other users) related to a new request, generates other(s) list(s) of resources, and generates a report for each list showing why and why the user should select it.

As illustrated in FIG. 4, a user 402 sends a list of required resources 404 (for example, CPU, memory, disk size, and software stack (applications and their versions)), and a preference criteria for application deployment (more robust, more scalable, faster response times) to the cloud provider 408. The user 402 subsequently receives from the provider 408 an Advice Report, which lists resource sets and reasons why/when they should be used. The user can select a resource set and confirm allocation, or refine the list and return to the step of preparing/sending a list of required resources 404. Additionally, the user receives a confirmation on the resource allocation (or a rejection in the case where resources are no longer available). If it is a rejection, the user can give up on this provider or return to the step of preparing/sending a list of required resources.

Further, as illustrated, the cloud provider 408 receives a request from a user 402 with his/her needs. The provider 408 creates a report containing a list of resource sets and reasons why each set should be used. This list can be sorted by user criteria (more robust, more scalable, faster response times, etc.). The provider sends the user this report, receives an allocation request confirmation, and answers the user whether or not allocation was successfully accomplished.

In connection with FIG. 4, an advice report, as detailed herein, is generated via steps of monitoring, data searching, statistical analysis and advice formulation. Accordingly, the provider monitors—via monitoring system module 416—resources (for example, CPU, memory, disk, database (DB) access, and network traffic) and resource changes performed by users (for example, release and allocation of resources, change of software and software version). Users can also inform the provider on resource changes, software crashes, application performance, etc. Providers can also log applications' response time/throughput and crashes, especially when users change resource sets.

Based on the new resource request needs and the provider's gathered information stored in a knowledge database 418, the resource provider searches for similarities of requests. Searched-for similarities include not only those between the new request and the current used resource sets, but also those between the new request and the original resource sets of current users. For each resource item of the new resource request, the provider searches for requests containing such an item or similar item (for example, the same software but a different version, or an approximate amount of required memory). For each found request, the provider gathers the history of changes of this request and reasons for changes, as well as the impact on application performance of those changes. Further, the provider creates a list of similar requests, their changes over time, and reasons of changes.

These similarities allow the provider to generate data used for statistical analysis, which can then generate suggestions such as, for example, the following. If a user requests DB v1 in his/her resource set: "X % of users changed from DB v1 to DB v2 when the number of DB concurrent accesses reached k %. According to your CPU/memory/disk request, you will likely reach k %; therefore, we suggest DB v2 instead of DB v1." Similarly, for example, if user requests software z v2.0: "Some users experienced software z v2.0 crashes when CPU load=x % on machine type t. Therefore, we suggest software z v1.8 instead of v2.0." Also, for instance, if user requests a given amount of memory and DB v2: "The combination of the amount of requested memory and DB v2.0 is not suitable. Therefore, we advise DB v1.8."

Based on these suggestions, a list of resource sets are then generated (which may be sorted by a given criteria), stating why the provider is potentially changing the original request. This gives user a chance to make better resource selection decisions.

An advice report can be used in a number of scenarios, such as, for instance, the following examples. Users can use an advice report for allocating resources of public clouds. An advice report can be used for identification of users with similar interests inside a cloud provider, which would allow the creation of mechanisms for these users to cooperate to make better resource allocation and application deployment decisions. Providers can use an advice report to charge for reports according to their level of details. Administrators of private and public clouds can use an advice report to improve capacity planning and deployment of user workloads, as these administrators can have better understanding of the computing environment and lessons learnt regarding resource consumption over time. Additionally, an advice report can also be used for notifying users already executing workloads about new lessons learnt from other users and better deployment strategies.

Figure 5:
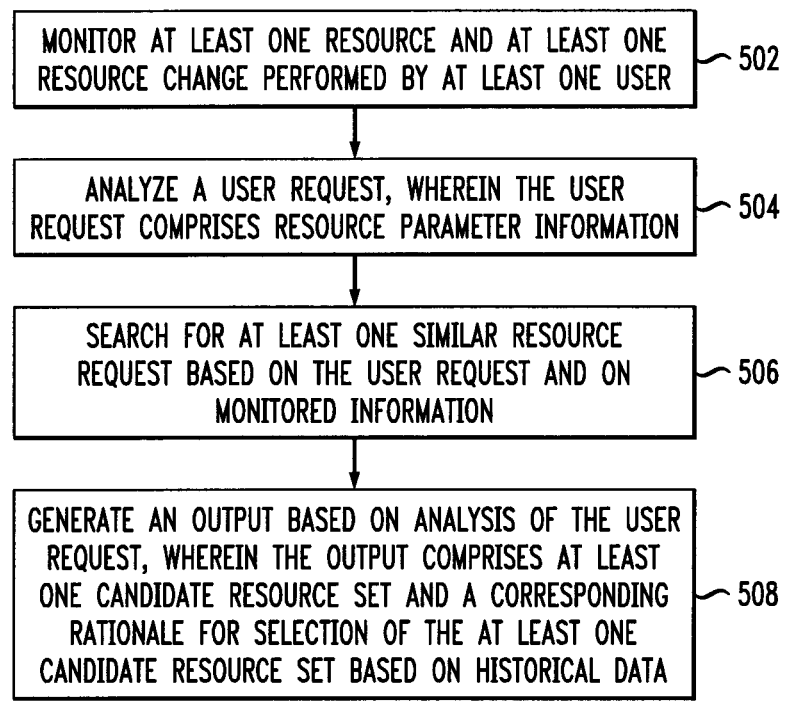
FIG. 5 is a flow diagram illustrating techniques for generating resource selection information, according to an embodiment of the invention.

FIG. 5 is a flow diagram illustrating techniques for generating resource selection information, according to an embodiment of the present invention. Step 502 includes monitoring at least one resource and at least one resource change performed by at least one user. Monitoring at least one resource includes monitoring central processing unit, memory, disk, database access, network traffic, etc. Also, monitoring at least one resource change performed by a user includes monitoring a release and allocation of resources, a change of software, a change of software version, etc. Further, monitoring a resource change performed by a user also includes monitoring user-provided information corresponding to a resource change, a software crash, application performance, etc., as well as logging an application response time and/or an application crash (especially when users change resource sets). Also, in an embodiment of the invention, monitoring at least one resource and at least one resource change performed by at least one user is a continuous process.

Step 504 includes analyzing a user request, wherein the user request comprises resource parameter information. This step can be carried out, for example, using a resource selection advisor module. Resource parameter information includes information pertaining to central processing unit, memory, disk size, software stack, etc. The user request can also include a preference criterion for application deployment (more robust, more scalable, faster response times, etc.).

Step 506 includes searching for at least one similar resource request based on the user request and on monitored information. Monitored information can include at least one resource and at least one resource change occurring continuously over time. Searching for a similar resource request based on the user request and on monitored information includes searching in a knowledge database. A similar resource request can include a similarity between the user request and a currently used resource set, and/or a similarity between the user request and an original resource set of at least one current user. Also, searching for a similar resource request includes, for each resource item of the user request, searching for a request containing the resource item or similar item, (for example, same software but different version, or approximate amount of required memory).

Step 508 includes generating an output (that is, a report) based on analysis of the user request, wherein the output comprises at least one candidate resource set and a corresponding rationale for selection of the at least one candidate resource set based on historical data. This step can be carried out, for example, using a resource selection advisor module. The candidate resource set and corresponding rationale for selection of the output can be sorted by a user criterion (more robust, more scalable, faster response times, etc.). Also, historical data includes a previous request and/or a resource change.

The techniques depicted in FIG. 5 also include gathering history of a change of each found request, reason for the change and impact on application performance, as well as maintaining information pertaining to user rationale for changing a resource set and an impact of the resource set change on the user's application. Additionally, an aspect of the invention includes sending the generated output to a user, as well as facilitating user selection of a resource set in response to the generated output. The techniques depicted in FIG. 5 can additionally include performing statistical analysis on a similar resource request based on the user request and on monitored information.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a resource selection advisor module, a monitoring system module, and a resource provisioner module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
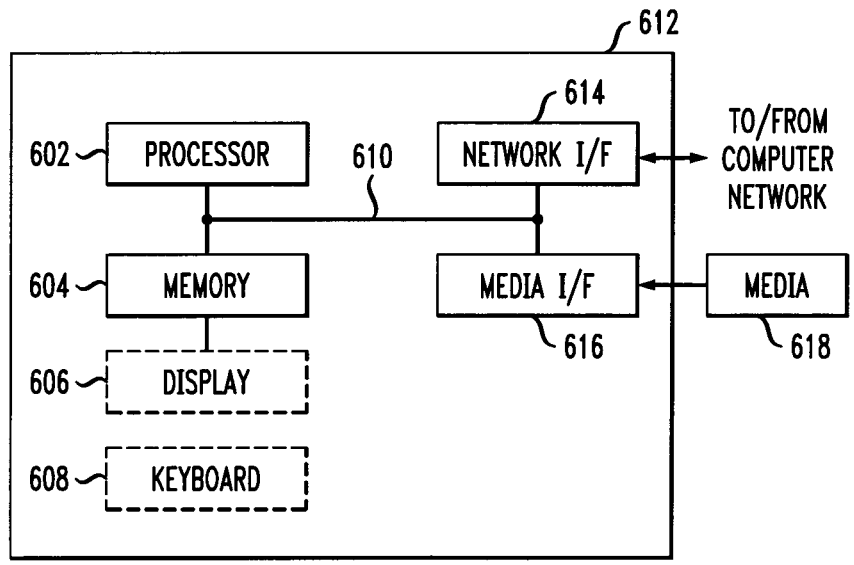
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, creating a knowledge base for a public cloud of template usage information and history.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating resource selection information, wherein the method comprises:
    monitoring multiple cloud resources and multiple cloud resource changes performed by multiple users on a cloud;
    analyzing a user request submitted by a requesting user, wherein the user request comprises cloud resource parameter information;
    searching for at least one similar cloud resource request based on the user request and on said monitoring; and
    generating an output based on said analyzing of the user request to provide to the requesting user, wherein the output comprises:
        at least one candidate cloud resource set; and
        a corresponding rationale for a proposed selection of the at least one candidate cloud resource set based on historical data associated with previous experiences of one or more additional users within a cloud context identified via said searching, wherein said corresponding rationale comprises (i) a stated resource-related reason, provided by a given one of the multiple users on the cloud separate from the requesting user, why the given user, in connection with at least one of the previous experiences, performed a given one of the multiple cloud resource changes that included a given cloud resource in the at least one candidate cloud resource set, and (ii) a determined impact, on at least computing capacity, of the given cloud resource change that included the given cloud resource in the at least one candidate cloud resource set;

wherein the output is sorted according to user-configured criteria comprising robustness, scalability, and response time;

wherein at least one of the steps is carried out by a computer device.

2. The method of claim 1, wherein said cloud resource parameter information comprises information pertaining to at least one of central processing unit, memory, disk size, and software stack.

3. The method of claim 1, wherein the user request further comprises a preference criterion for application deployment.

4. The method of claim 1, wherein monitoring multiple cloud resources comprises monitoring at least one of central processing unit, memory, disk, database access and network traffic.

5. The method of claim 1, wherein monitoring multiple cloud resource changes performed by multiple users on a cloud comprises monitoring at least one of a release and allocation of cloud resources, a change of software and a change of software version.

6. The method of claim 1, wherein monitoring multiple cloud resource changes performed by multiple users on a cloud comprises monitoring user-provided information corresponding to at least one of a cloud resource change, a software crash and application performance.

7. The method of claim 1, wherein monitoring multiple cloud resource changes performed by multiple users on a cloud comprises logging at least one of an application response time and an application crash.

8. The method of claim 1, wherein searching for at least one similar cloud resource request based on the user request and on said monitoring comprises searching in a knowledge database.

9. The method of claim 1, wherein the at least one similar cloud resource request comprises at least one of a similarity between the user request and a currently used cloud resource set, and a similarity between the user request and an original cloud resource set of at least one current user.

10. The method of claim 1, wherein searching for at least one similar cloud resource request based on the user request and on said monitoring comprises, for each resource item of the user request, searching for a request containing the cloud resource item or a similar item.

11. The method of claim 10, further comprising gathering history of a change of each found request, reason for the change and impact on application performance.

12. The method of claim 1, further comprising sending the generated output to a user.

13. The method of claim 1, further comprising maintaining information pertaining to user rationale for changing a cloud resource set and an impact of the cloud resource set change on the user's application.

14. The method of claim 1, further comprising facilitating user selection of a cloud resource set in response to the generated output.

15. The method of claim 1, further comprising performing statistical analysis on the at least one similar cloud resource request based on the user request and on said monitoring.

16. The method of claim 1, wherein monitoring multiple cloud resources and multiple cloud resource changes performed by multiple users on a cloud is a continuous process.

17. The method of claim 1, wherein historical data comprises at least one of a previous request and a cloud resource change.

18. An article of manufacture comprising a non-transitory computer readable storage medium having computer readable instructions tangibly embodied thereon which, when implemented, cause a computer to carry out a plurality of method steps comprising:

monitoring multiple cloud resources and multiple cloud resource changes performed by multiple users on a cloud;

analyzing a user request submitted by a requesting user, wherein the user request comprises cloud resource parameter information;

searching for at least one similar cloud resource request based on the user request and on said monitoring; and generating an output based on said analyzing of the user request to provide to the requesting user, wherein the output comprises:

at least one candidate cloud resource set; and a corresponding rationale for a proposed selection of the at least one candidate cloud resource set based on historical data associated with previous experiences of one or more additional users within a cloud context identified via said searching, wherein said corresponding rationale comprises (i) a stated resource-related reason, provided by a given one of the multiple users on the cloud separate from the requesting user, why the given user, in connection with at least one of the previous experiences, performed a given one of the multiple cloud resource changes that included a given cloud resource in the at least one candidate cloud resource set, and (ii) a determined impact, on at least computing capacity, of the given cloud resource change that included the given cloud resource in the at least one candidate cloud resource set, and wherein the output is sorted according to user-configured criteria comprising robustness, scalability, and response time.

19. The article of manufacture of claim 18, wherein the computer readable instructions which, when implemented, further cause a computer to carry out a method step comprising:

facilitating user selection of a cloud resource set in response to the generated output.

20. A system for generating resource selection information, comprising:

a memory; and at least one processor coupled to the memory and operative for:

monitoring multiple cloud resources and multiple cloud resource changes performed by multiple users on a cloud;

analyzing a user request submitted by a requesting user, wherein the user request comprises cloud resource parameter information;

searching for at least one similar cloud resource request based on the user request and on said monitoring; and generating an output based on said analyzing of the user request to provide to the requesting user, wherein the output comprises:

at least one candidate cloud resource set; and a corresponding rationale for a proposed selection of the at least one candidate cloud resource set based on historical data associated with previous experiences of one or more additional users within a cloud context identified via said searching, wherein said corresponding rationale comprises (i) a stated resource-related reason, provided by a given one of the multiple users on the cloud separate from the requesting user, why the given user, in connection with at least one of the previous experiences, performed a given one of the multiple cloud resource changes that included a given cloud resource in the at least one candidate cloud resource set, and (ii) a determined impact, on at least computing capacity, of the given cloud resource change that included the given cloud resource in the at least one candidate cloud resource set; and wherein the output is sorted according to user-configured criteria comprising robustness, scalability, and response time.

21. The system of claim 20, wherein the at least one processor coupled to the memory is further operative for: facilitating user selection of a cloud resource set in response to the generated output.

\* \* \* \* \*